M. BRAY.
Rivet.
No. 203,815. Patented May 21, 1878.
Fig. 1.
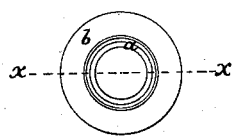
Fig. 2.
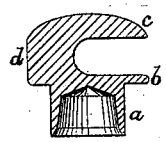
Fig. 3.
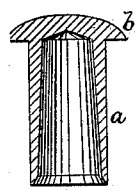     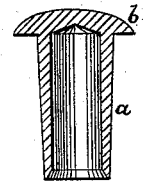
Fig. 4.     Fig. 5.
WITNESSES:
E. A. Hemmenway
Benj. Andrews Jr.
INVENTOR:
Mellen Bray
By N. C. Lombard
ATTORNEY.

UNITED STATES PATENT OFFICE.

MELLEN BRAY, OF NEWTON, MASSACHUSETTS.

IMPROVEMENT IN RIVETS.

Specification forming part of Letters Patent No. 203,815, dated May 21, 1878; application filed February 20, 1878.

*To all whom it may concern:*

Be it known that I, MELLEN BRAY, of Newton, in the county of Middlesex and State of Massachusetts, have invented a new and useful Improvement in Rivets, of which the following, taken in connection with the accompanying drawings, is a specification.

My invention relates to an improvement in the construction of the hollow shanks of shoe-studs and tubular rivets, designed for use in securing together two or more pieces of leather or other soft flexible material, or to be set therein, whereby said rivet or stud-shank is better adapted to resist the pressure applied thereto to force it through the material, and causing it to cut its own way, and is an improvement upon the invention described in Letters Patent No. 157,116, granted to me November 24, 1874; and it consists in forming said tubular shank with its walls of varying thickness—that is, gradually increasing in thickness from a point near its cutting-edge to the under side of its head—with a chamber within said shank of uniform diameter throughout, or slightly smaller at its inner end than at its outer end, so that the wall of the shank shall present the greatest possible resistance to the pressure exerted to force it through the material with the least amount of metal, thereby enabling it to cut its own way through the material without crippling.

The object of this invention is to overcome a difficulty in setting tubular rivets or studs, which consists in the crippling of the shank just under the head occasioned by the resistance presented to the passage of the shank through the material in cutting its own way. This I have found to be a source of considerable trouble, especially if the rivet or shoe-stud is made of brass, and is made to cut its own way through the material, as is now the almost universal method; but I have also found by actual test that increasing the thickness of the walls of the tubular shank toward the head entirely obviates this difficulty, and this increase of thickness may be obtained by making the exterior of the shank of uniform diameter throughout, and drilling out its center with a tapering drill, so as to form therein a chamber extending from its end to the under side of the head, and gradually diminishing in diameter toward the head; or the rivet may be formed with an exteriorly-tapering shank, and have formed therein a chamber of uniform diameter extending to the under side of the head.

Another advantage of this improvement is that the shank clinches better, turning over onto the material with a more even and true curve, and is less liable to split, and making smoother work.

Figure 1 is a side elevation of a shoe-stud rivet to the shank of which my improvement is applied. Fig. 2 is an inverted plan of the same. Fig. 3 is a central vertical section on line *x x* on Fig. 2. Fig. 4 is a central vertical section of a plain rivet; and Fig. 5 is a similar section, illustrating a modified construction of said rivet.

In the drawings, *a* is the tubular shank of the plain or stud rivet. *b* is the head proper, which bears upon and clamps the leather or other material when the rivet or stud is set therein, and *c* is the secondary head, which, with the eccentric neck *d*, forms the hook of the shoe-stud, as shown in Figs. 1 and 3, which hook is designed to receive a lacing-cord, substantially as and for the purposes described in Letters Patent granted to A. Dawes, March 27, 1877, and numbered 188,780.

The shank *a*, whether forming a part of a shoe-stud rivet or of a plain rivet, is made tubular from its end to the under side of the head *b*, the walls of said tube being made thicker just under the head than at its point, and the chamber formed within said shank being made uniform in diameter throughout, as shown in Fig. 5, or slightly smaller at its inner end than at its outer end, as shown in Figs. 3 and 4. This may be readily accomplished in two ways—that is, by first forming a solid rivet with its shank of uniform diameter throughout, and then drilling out the center of said shank with a tapering drill, so as to form therein a chamber of varying diameter, as shown in Figs. 3 and 4; or the rivet may be formed with its shank tapering exteriorly from the under side of the head *b* toward the point, and then drilling out its center, so as to form therein a chamber of uniform diameter, as shown in Fig. 5.

It will be obvious to the careful observer that the shank *a* and head *b* of the shoe-stud shown in Figs. 1, 2, and 3 constitute a rivet as much as the rivet shown in Figs. 4 and 5, and that the addition thereto of the secondary head *c* and neck *d* does not make it any the less a rivet, as in both cases the shank is forced through the leather or other material, cutting its own way, and is clinched by turning the tubular end of the shank over upon the material in the same manner as ordinary eyelets are set.

I am aware that tubular rivets having solid heads and cutting-edges have been used before, such being the subject of a prior patent granted to me November 24, 1874, and therefore I make no claim in this case to such construction, broadly.

I am also aware that eyelets open at both ends have been made with the stock thinner at one end than at the other, as described in Letters Patent, No. 53,234, granted to Jesse F. Richards, March 13, 1866; and therefore I do not claim anything shown and described in said patent to Richards; but

What I claim as new, and desire to secure by Letters Patent of the United States, is—

A tubular rivet closed at one end by a solid head, *b*, and having the walls of its tubular shank of varying thickness, gradually increasing from its point or cutting end to the under side of said head, and the chamber within said shank having a diameter at its outer end not less than that of its inner end, with or without the secondary head *c* and neck *d*, substantially as and for the purposes described.

Executed at Boston, Massachusetts, this 15th day of February, A. D. 1878.

MELLEN BRAY.

Witnesses:
N. C. LOMBARD,
E. A. HEMMENWAY.